(12) United States Patent
Chen et al.

(10) Patent No.: US 11,048,141 B2
(45) Date of Patent: Jun. 29, 2021

(54) ELECTRIC FIELD GENERATING SUBSTRATE AND LIQUID CRYSTAL LENS COMPRISING THE SAME

(71) Applicant: National Chiao Tung University, Hsinchu (TW)

(72) Inventors: Huang-Ming Chen, Hsinchu County (TW); Yu-Kuan Chang, Changhua County (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/654,118

(22) Filed: Oct. 16, 2019

(65) Prior Publication Data

US 2020/0355982 A1    Nov. 12, 2020

(30) Foreign Application Priority Data

May 7, 2019 (TW) .................................. 108115640

(51) Int. Cl.
| | |
|---|---|
| *G02F 1/13* | (2006.01) |
| *G02F 1/29* | (2006.01) |
| *H04N 13/236* | (2018.01) |
| *G02B 30/27* | (2020.01) |

(52) U.S. Cl.
CPC .............. *G02F 1/29* (2013.01); *G02B 30/27* (2020.01); *G02F 1/1313* (2013.01); *H04N 13/236* (2018.05)

(58) Field of Classification Search
None
See application file for complete search history.

(56) References Cited

U.S. PATENT DOCUMENTS 5,617,109 A * 4/1997 DeJule .............. G02F 1/134309
345/100

OTHER PUBLICATIONS

Yu-Kuan Chang and Huang-Ming Philip Chen, "Electrical Tunable Light Deflecting Liquid Crystal Lens", Annual Meeting of Taiwan Liquid Crystal Society, 2018, three pages.
Yu-Kuan Chang and Huang-Ming Philip Chen, "Electrical Tunable Light Deflecting Liquid Crystal Lens", Annual Meeting of Taiwan Liquid Crystal Society, 2018, seven pages.

* cited by examiner

*Primary Examiner* — James A Dudek
(74) *Attorney, Agent, or Firm* — Bacon & Thomas, PLLC

(57) ABSTRACT

Provided is an electric field generating substrate and a liquid crystal lens containing the same. The electric field generating substrate contains: a first substrate; and a first electric field generating unit disposed on the first substrate. The first electric field generating unit contains: a first main electrode; a second main electrode; and a first sub-electrode disposed between the first main electrode and the second main electrode. The first sub-electrode electrically connects to the first main electrode and the second main electrode. A first resistor is disposed between the first main electrode and the first sub-electrode, and a second resistor is disposed between the first sub-electrode and the second main electrode. In addition, the first main electrode, the second main electrode and the first sub-electrode are substantially parallel to each other.

17 Claims, 11 Drawing Sheets

ELECTRIC FIELD GENERATING SUBSTRATE AND LIQUID CRYSTAL LENS COMPRISING THE SAME

CROSS REFERENCE TO RELATED APPLICATION

This application claims the benefits of the Taiwan Patent Application Serial Number 108115640, filed on May 7, 2019, the subject matter of which is incorporated herein by reference.

BACKGROUND

1. Field

The present disclosure relates to an electric field generating substrate and a liquid crystal lens comprising the same and, more particularly, to an electric field generating substrate having a novel structure and a liquid crystal lens comprising the same.

2. Description of Related Art

In a conventional device such as a camera, it is necessary to change the focus position by changing the relative position between the lens groups, so that zooming is performed. However, performing zooming in such manner needs sufficient space and thus contradicts to the current trend (such as thinness and lightweight) for the electronic products.

Since the liquid crystal lens has electrical modulation property, the focus position or the deflection direction of the light can be controlled through an applied electric field. Meanwhile, it has advantages of lightweight components and low power consumption, so that such lens is promising.

In addition, the application of the liquid crystal lens is not limited to the lens. Since the liquid crystal lens can achieve the effect of light deflection, the liquid crystal lens can be used to increase the viewing angle of the display, and it can be applied to optical communication or lighting design. For example, in a display cabinet, a showpiece or merchandise is focused by controlling the position where the light projects. Alternatively, it can be used in an office or at home to change the light illumination angle and direction, thereby bringing different atmospheres to the room.

However, the conventional liquid crystal lens has disadvantages including complicated preparation process and driving method, so that it cannot be widely used in daily life. In view of this, there is an urgent need to develop a liquid crystal lens having a novel structure, wherein the electric field generating substrate has a simple preparation process and a simple driving method, so that the liquid crystal lens can be widely used.

SUMMARY OF THE DISCLOSURE

The present disclosure provides an electric field generating substrate, and an electric field generating unit on which has a unique pattern design. In addition, the present disclosure further provides a liquid crystal lens using the aforementioned electric field generating substrate.

One object of the present disclosure is to provide an electric field generating substrate, comprising: a first substrate; and a first electric field generating unit disposed on the first substrate. The first electric field generating unit comprises: a first main electrode; a second main electrode; and a first sub-electrode disposed between the first main electrode and the second main electrode, wherein the first sub-electrode electrically connects to the first main electrode and the second main electrode, a first resistor is disposed between the first main electrode and the first sub-electrode, and a second resistor is disposed between the first sub-electrode and the second main electrode; wherein, the first main electrode, the second main electrode and the first sub-electrode are substantially parallel to each other.

As described above, the electric field generating substrate of the present disclosure includes the first main electrode, the second main electrode, and the first sub-electrode which are substantially parallel to each other. The first electric field generating unit can generate a gradient electric field by disposing the first resistor between the first main electrode and the first sub-electrode and disposing the second resistor between the first sub-electrode and the second main electrode. The gradient electric field is formed by controlling the voltage applied to the first electric field generate unit when the electric field generating substrate of the present disclosure is applied to a liquid crystal lens. The gradient electric field causes a phase difference for an incident light, which is incident on the liquid crystal lens, so that the incident light will be deflected. Thereby, the focusing effect or diffusion effect can be achieved.

In the electric field generating substrate of the present disclosure, the first electric field generating unit may further comprise a second sub-electrode disposed between the first sub-electrode and the second main electrode, and the second sub-electrode electrically connects to the first sub-electrode and the second main electrode. A third resistor is disposed between the first sub-electrode and the second sub-electrode, the second resistor is disposed between the second sub-electrode and the second main electrode, and the first main electrode, the second main electrode, the first sub-electrode, and the second sub-electrode are substantially parallel to each other.

In one aspect of the present disclosure, the electric field generating substrate may further comprise a second electric field generating unit disposed on the first substrate. The second electric field generating unit may comprise: a third main electrode; a fourth main electrode; and a third sub-electrode disposed between the third main electrode and the fourth main electrode, wherein the third sub-electrode electrically connects to the third main electrode and the fourth main electrode, a fourth resistor is disposed between the third main electrode and the third sub-electrode, and a fifth resistor is disposed between the third sub-electrode and the fourth main electrode; wherein, the first main electrode, the second main electrode, the third main electrode, the fourth main electrode, the first sub-electrode, and the third sub-electrode are substantially parallel to each other.

In one aspect of the present disclosure, the electric field generating substrate may further comprise a second electric field generating unit disposed on the first substrate. The second electric field generating unit may comprise: a third main electrode; a fourth main electrode; a third sub-electrode disposed between the third main electrode and the fourth main electrode, wherein the third sub-electrode electrically connects to the third main electrode, and a fourth resistor is disposed between the third main electrode and the third sub-electrode; and a fourth sub-electrode disposed between the third sub-electrode and the fourth main electrode, wherein the fourth sub-electrode electrically connects to the third sub-electrode and the fourth main electrode, a fifth resistor is disposed between the third sub-electrode and the fourth main electrode, and a sixth resistor is disposed between the third sub-electrode and the fourth sub-electrode;

wherein, the first main electrode, the second main electrode, the third main electrode, the fourth main electrode, the first sub-electrode, the second sub-electrode, the third sub-electrode, and the fourth sub-electrode are substantially parallel to each other.

In another aspect of the present disclosure, the electric field generating substrate may comprise one or a plurality of first electric field generating units, and may further comprise one or a plurality of second electric field generating units. When the electric field generating substrate of the present disclosure comprises the plurality of first electric field generating units and the plurality of second electric field generating units, the first electric field generating units and the second electric field generating units may be alternately arranged.

When the electric field generating substrate comprises the plurality of first electric field generating units and the plurality of second electric field generating units, the first main electrodes of the first electric field generating units may electrically connect to each other, the second main electrodes of the first electric field generating units may electrically connect to each other, the third main electrodes of the second electric field generating units may electrically connect to each other, and the fourth main electrodes of the second electric field generating units may electrically connect to each other In the electric field generating substrate of the present disclosure, the first main electrode, the second main electrode, the third main electrode, the fourth main electrode, the first sub-electrode, the second sub-electrode, the third sub-electrode, and the fourth sub-electrode are substantially parallel to each other, and the present disclosure is not restrictive of the shape thereof. In an embodiment of the present disclosure, the first main electrode, the second main electrode, the third main electrode, the fourth main electrode, the first sub-electrode, the second sub-electrode, the third sub-electrode, and the fourth sub-electrode are line electrodes. The line electrode may include a straight line electrode, a curved electrode, a zigzag electrode, or the like. However, the present disclosure is not limited thereto, as long as the longitudinal directions of the first main electrode, the second main electrode, the third main electrode, the fourth main electrode, the first sub-electrode, the second sub-electrode, the third sub-electrode, and the fourth sub-electrode are substantially parallel to each other. In one embodiment of the present disclosure, the first main electrode, the second main electrode, the third main electrode, the fourth main electrode, the first sub-electrode, the second sub-electrode, the third sub-electrode, and the fourth sub-electrode are line electrodes.

In the electric field generating substrate of one aspect of the present disclosure, the width of the first electric field generating unit may be in a range from 4 µm to 80 µm. For example, it may be in a range from 4 µm to 70 µm, 4 µm to 60 µm, or 4 µm to 50 µm. However, the present disclosure is not limited thereto, and it may be adjusted, according to the application field or requirement of the electric field generating substrate. Herein, a distance from an edge of the first main electrode to an edge of the second main electrode is defined as the width of the first electric field generating unit; wherein said edge of the first main electrode is away from the second main electrode, and said edge of the second main electrode is away from the first main electrode.

Likewise, in the electric field generating substrate of one aspect of the present disclosure, the width of the second electric field generating unit may be in a range from 4 µm to 80 µm. For example, it may be in a range from 4 µm to 70 µm, 4 µm to 60 µm, or 4 µm to 50 µm. However, the present disclosure is not limited thereto, and it may be adjusted, according to the application field of requirement of the electric field generating substrate. Herein, a distance from an edge of the third main electrode to an edge of the fourth main electrode is defined as the width of the second electric field generating unit; wherein said edge of the third main electrode is away from the fourth main electrode, and said edge of the fourth main electrode is away from the third main electrode.

In another aspect of the present disclosure, the width of the first main electrode, the second main electrode, the third main electrode, the fourth main electrode, the first sub-electrode, the second sub-electrode, the third sub-electrode, and the fourth sub-electrode may be in a range from 0.5 µm to 10 µm, respectively. For example, it may be in a range from 1 µm to 5 µm. However, the present disclosure is not limited thereto, and it may be adjusted, according to the application field or requirement of the electric field generating substrate.

Yet another object of the present disclosure is to provide a method for preparing the aforementioned electric field generating substrate, and the method comprises following steps of: providing a first substrate having an electrode layer disposed thereon; patterning the electrode layer to form a main electrode (for example, a first main electrode, a second main electrode, a third main electrode, and/or a fourth main electrode) and a sub-electrode (for example, a first sub-electrode, a second sub-electrode, a third sub-electrode, and/or a fourth sub-electrode); and forming a resistor (for example, a first resistor, a second resistor, a third resistor, a fourth resistor, a fifth resistor, and/or a sixth resistor) between the main electrode and the sub-electrode.

In the preparation method of the present disclosure, the step of patterning the electrode layer may use any known patterning method, for example, an etching method. Further, in the preparation method of the present disclosure, the step of forming the resistor may use any known coating method such as spin coating, comma coating, ink jet method, printing method, roll coating, spray coating, or the like. In an embodiment of the present disclosure, the step of forming the resistor unit may use a gas sol inkjet method.

One object of the present disclosure is to provide a liquid crystal lens using the aforementioned electric field generating substrate, and the liquid crystal lens comprises: a first electric field generating substrate, which may be any of the aforementioned electric field; a second electric field generating substrate disposed opposite to the first electric field generating substrate; and a liquid crystal layer disposed between the first electric field generating substrate and the second electric field generating substrate. In the liquid crystal lens of this aspect of the present disclosure, the second electric field generating substrate may comprise: a second substrate and a planar electrode layer, wherein the planar electrode layer is disposed on one side, facing the first substrate, of the second substrate. The liquid crystal lens of this aspect of the present disclosure may further comprise: a first alignment layer disposed on the first main electrode, the second main electrode, and the first sub-electrode; and a second alignment layer disposed on the planar electrode layer, wherein an alignment direction of the first alignment layer is substantially the same as an alignment direction of the second alignment layer.

One object of the present disclosure is to provide another liquid crystal lens, comprising: two first electric field generating substrates, wherein the two first electric field generating substrates may be any of the aforementioned electric field generating substrate; and a liquid crystal layer disposed between the two first electric field generating substrates. In the liquid crystal lens of this aspect of the present disclosure, the longitudinal directions of the first main electrode, the second main electrode and the first sub-electrode of one of the two first electric field generating substrates are substantially the same as the longitudinal directions of the first main electrode, the second main electrode and the first sub-electrode of the other of the two first electric field generating substrates. In addition, the liquid crystal lens of this aspect of the present disclosure may further comprise: a first alignment layer disposed on the first main electrode, the second main electrode and the first sub-electrode of one of the two first electric field generating substrates; and a second alignment layer disposed on the first main electrode, the second main electrode and the first sub-electrode of the other of the two first electric field generating substrates. An alignment direction of the first alignment layer may be substantially the same as or perpendicular to an alignment direction of the second alignment layer.

In the electric field generating substrate and the liquid crystal lens of the present disclosure, the first substrate and the second substrate may be a rigid substrate, a flexible substrate, a film, or a combination thereof, respectively. The material of the first substrate may include a quartz substrate, a glass substrate, a wafer substrate, a sapphire substrate, polycarbonate (PC), polyimide (PI), polypropylene (PP), polyethylene terephthalate (PET), or other plastic or polymeric materials, or a combination thereof. However, the present disclosure is not limited thereto.

In the electric field generating substrate and the liquid crystal lens of the present disclosure, the main electrode (for example, the first main electrode, the second main electrode, the third main electrode and/or the fourth main electrode), the sub-electrode (for example, the first sub-electrode, the second sub-electrode, the third sub-electrode and/or the fourth sub-electrode) and the planar electrode layer may respectively comprise a transparent conducting metal oxide (for example, ITO, IZO, ITZO, IGZO or AZO), a metal (for example, titanium or aluminum), heavily-doped silicon (for example, phosphorus-doped silicon).

In the electric field generating substrate and the liquid crystal lens of the present disclosure, the resistor (for example, the first resistor, the second resistor, the third resistor, the fourth resistor, the fifth resistor, and/or \thea sixth resistor) may comprise any resistive material, for example, PEDOT:PPS, high resistance carbon nanotubes, doped silicon, or metal oxides (for example, ZnO, $VO_2$, $SnO_2$, MoOx or vanadium-doped molybdenum oxide).

In the present disclosure, "electrodes are substantially parallel to each other" indicates that two main electrodes are completely parallel to each other, a main electrode and a sub-electrode are parallel to each other, an angle between the extension lines of the two main electrodes is less than five degrees, or an angle between the extension lines of a main electrode and a sub-electrode is less than five degrees. In addition, "longitudinal directions of the electrodes are substantially the same" indicates that the longitudinal directions of the two main electrodes completely parallel to each other, the longitudinal directions of a main electrode and a sub-electrode are parallel to each other, an angle between the longitudinal directions of two main electrodes is less than five degrees, or an angle between the longitudinal directions of a main electrode and a sub-electrode is less than five degrees. Furthermore, "alignment directions are substantially the same" indicates that the alignment directions of the two alignment layers are completely the same, or an angle between the alignment directions of the two alignment layers is less than five degrees. Meanwhile, "alignment directions are substantially perpendicular" indicates that an angle between the alignment directions of the two alignment layers is in a range from 85 degrees to 90 degrees.

Other objects, advantages, and novel features of the disclosure will become more apparent from the following detailed description when taken in conjunction with the accompanying drawings.

DETAILED DESCRIPTION OF THE EMBODIMENT

Ordinal numbers, such as "first," "second" and "third", used herein are intended to distinguish components rather than disclose explicitly or implicitly that names of the components bear the wording of the ordinal numbers. The ordinal numbers do not imply what order a component and another component are in terms of space, time or steps of a manufacturing method. The ordinal numbers are only intended to distinguish a component with a name from another component with the same name.

Embodiment 1

Figure 1A:
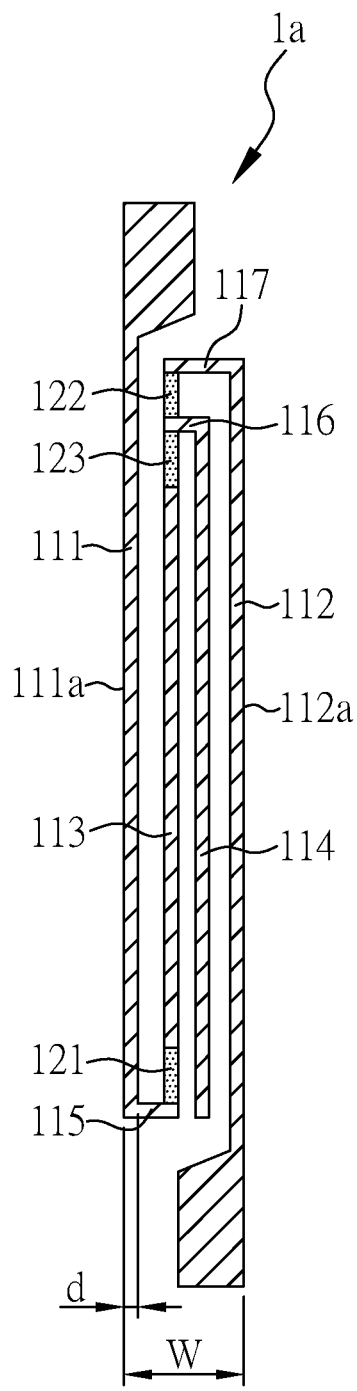
FIG. 1A is a top view of a first electric field generating unit according to Embodiment 1 of the present disclosure.
Figure 1B:
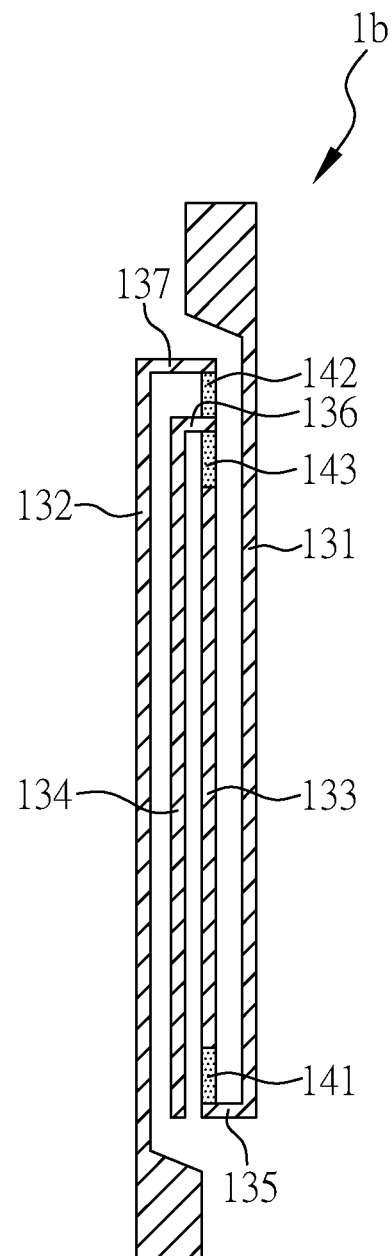
FIG. 1B is a top view of a second electric field generating unit according to Embodiment 1 of the present disclosure.
Figure 2:
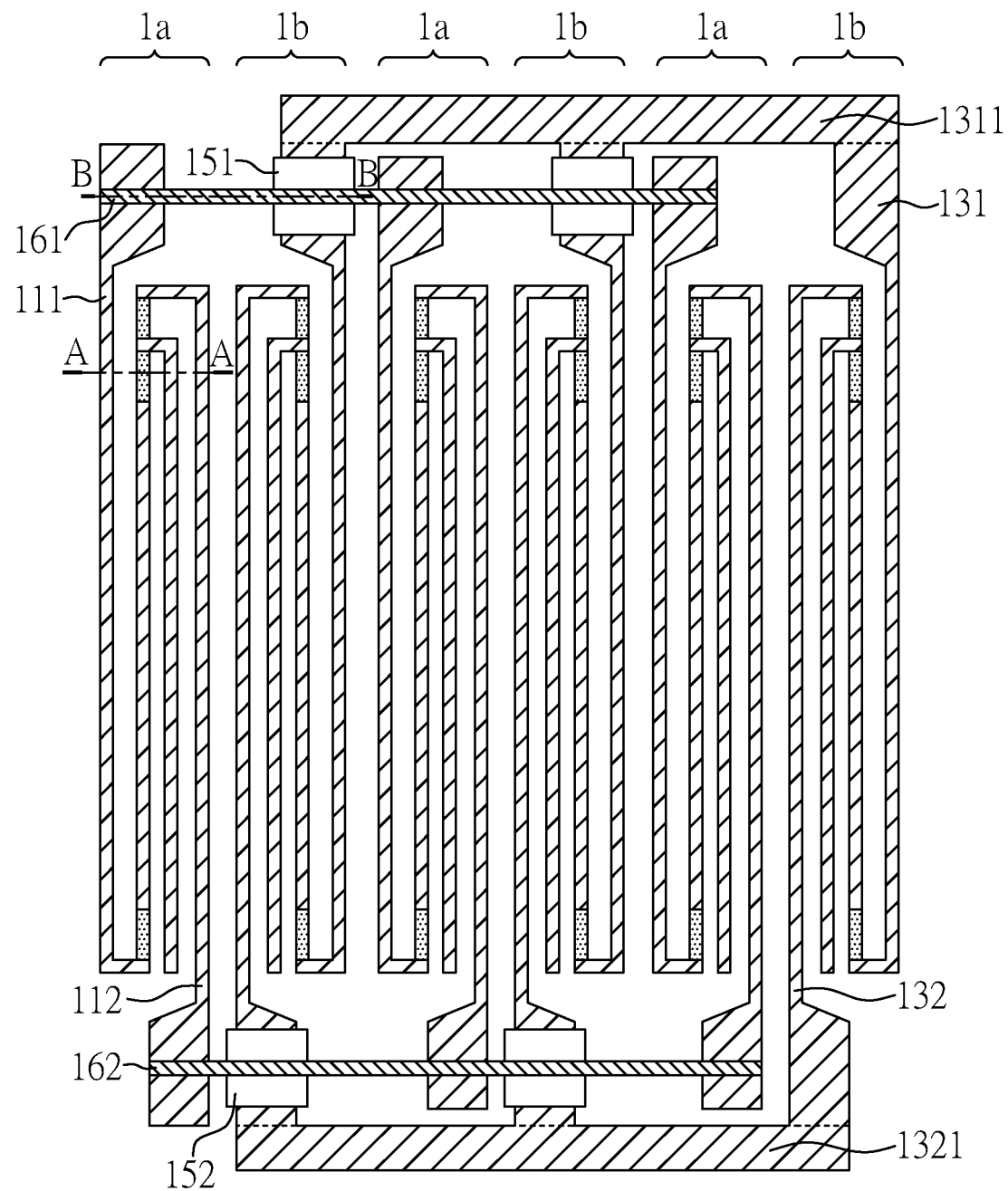
FIG. 2 is a top view of an electric field generating substrate according to Embodiment 1 of the present disclosure.
Figure 3A:
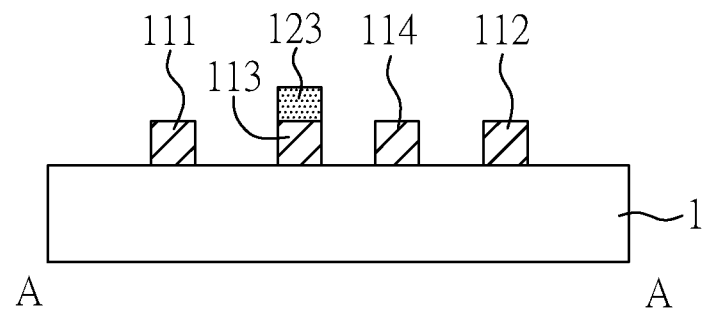
FIG. 3A is a cross-sectional view taken along line A-A of FIG. 2.
Figure 3B:
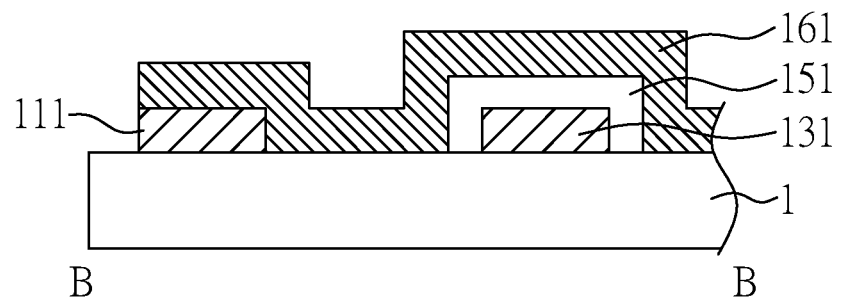
FIG. 3B is a cross-sectional view taken along line B-B of FIG. 2.

FIG. 1A and FIG. 1B are top views of a first electric field generating unit and a second electric field generating unit according to the present embodiment. FIG. 2 is a top view of an electric field generating substrate according to the present embodiment. FIG. 3A and FIG. 3B are cross-sectional views taken along line A-A and line B-B of FIG. 2, respectively.

As shown in FIG. 1A to FIG. 3A, first, a first substrate 1 having an electrode layer disposed thereon is provided. In the present embodiment, the first substrate 1 is a glass substrate having an ITO layer disposed thereon. Then, the electrode layer is patterned by etching to form a plurality of parallel line electrodes, respectively comprising a first main electrode 111, a second main electrode 112, a first sub-electrode 113, a second sub-electrode 114, a third main electrode 131, a fourth main electrode 132, a third sub-electrode 133 and a fourth sub-electrode 134. In addition, connection electrodes 115, 116, 117, 135, 136, 137 are respectively formed between the first main electrode 111 and the first sub-electrode 113, between the first sub-electrode 113 and the second sub-electrode 114, between the first sub-electrode 113 and the second main electrode 112, between the third main electrode 131 and the third sub-electrode 133, between the third sub-electrode 133 and the fourth sub-electrode 134, and between the third sub-electrode 133 and the fourth main electrode 132, so that the first main electrode 111 electrically connects to the first sub-electrode 113, the first sub-electrode 113 electrically connects to the second sub-electrode 114, the first sub-electrode 113 electrically connects to the second main electrode 112, the third main electrode 131 electrically connects to the third sub-electrode 133, the third sub-electrode 133 electrically connects to the fourth sub-electrode 134, and the third sub-electrode 133 electrically connects to the fourth main electrode 132.

The PEDOT:PPS is then sprayed, by aerosol jet printing, as a resistive material to form a first resistor 121 between the first min electrode 111 and the first sub-electrode 113, form a second resistor 122 between the first sub-electrode 113 and the second main electrode 112, form a third resistor 123 between the first sub-electrode 113 and the second sub-electrode 114, form a fourth resistor 141 between the third main electrode 131 and the third sub-electrode 133, form a fifth resistor 142 between the third sub-electrode 133 and the fourth main electrode 132, and form a sixth resistor 143 between the third sub-electrode 133 and the fourth sub-electrode 134. Thereby, a first electric field generating unit 1a and a second electric field generating unit 1b of the present embodiment are obtained.

In the present disclosure, the positions of the first resistor 121, the second resistor 122, the third resistor 123, the fourth resistor 141, the fifth resistor 142, and the sixth resistor 143 are not limited to the positions shown in FIG. 1A and FIG. 1B, and may be disposed at other positions as long as the connection relationships between the resistor and the main electrode and between the resistor the sub-electrode are the same as described above.

In addition, the lengths of the first resistor 121, the second resistor 122, the third resistor 123, the fourth resistor 141, the fifth resistor 142, and the sixth resistor 143 are not limited and may be adjusted according to the desired voltage decrement. In the present embodiment, the lengths of the first resistor 121, the second resistor 122, the third resistor 123, the fourth resistor 141, the fifth resistor 142, and the sixth resistor 143 are 15 μm, respectively. However, in other embodiments of the present disclosure, the lengths of the first resistor 121, the second resistor 122, the third resistor 123, the fourth resistor 141, the fifth resistor 142, and the sixth resistor 143 may be in a range from 15 μm to 50 μm, respectively. If the resistor is bent which is not in a linear design, the length of the aforementioned resistor is a length obtained by straightening the bending resistor.

As shown in FIG. 1A, FIG. 2 and FIG. 3A, the electric field generating substrate of the present embodiment comprises: a first substrate 1; and a first electric field generating unit 1a disposed on the first substrate 1. The first electric field generating unit 1a comprises: a first main electrode 111, a second main electrode 112, a first sub-electrode 113, and a second sub-electrode 114. The first sub-electrode 113 is disposed between the first main electrode 111 and the second main electrode 112, the first sub-electrode 113 electrically connects to the first min electrode 111 and the second main electrode 112, the second sub-electrode 114 disposed between the first sub-electrode 113 and the second main electrode 112, and the second sub-electrode 114 electrically connects to the first sub-electrode 113 and the second main electrode 112. A first resistor 121 is disposed between the first main electrode 111 and the first sub-electrode 113, a second resistor 122 is disposed between the second sub-electrode 114 and the second main electrode 112, and a third resistor 123 is disposed between the first sub-electrode 113 and the second sub-electrode 114. In addition, the first main electrode 111, the second main electrode 112, the first sub-electrode 113, and the second sub-electrode 114 are substantially parallel to each other.

As shown in FIG. 1B, FIG. 2 and FIG. 3A, the electric field generating substrate further comprises: a second electric field generating unit 1b disposed on the first substrate 1. The second electric field generating unit 1b comprises: a third main electrode 131, a fourth min electrode 132, a third sub-electrode 133, and a fourth sub-electrode 134, The third sub-electrode 133 is disposed between the third main electrode 131 and the fourth main electrode 132, the third sub-electrode 133 electrically connects to the third main electrode 131 and the fourth main electrode 132, the fourth sub-electrode 134 is disposed between the third sub-electrode 133 and the fourth main electrode 132, and the fourth sub-electrode 134 electrically connects to the third sub-electrode 133 and the fourth main electrode 132. A fourth resistor 141 is disposed between the third main electrode 131 and the third sub-electrode 133, a fifth resistor 142 is disposed between the third sub-electrode 133 and the fourth main electrode 132, and a sixth resistor 143 is disposed between the third sub-electrode 133 and the fourth sub-electrode 134. In addition, the first main electrode 111, the second main electrode 112, the third main electrode 131, the fourth main electrode 132, the first sub-electrode 113, the second sub-electrode 114, the third sub-electrode 133, and the fourth sub-electrode 134 are substantially parallel to each other.

In the present embodiment, three first electric field generating units 1a and three second electric field generating units 1b are formed, as shown in FIG. 2. However, the present disclosure is not limited thereto. In other embodiment of the present disclosure, the numbers of the first electric field generating unit 1a and the second electric field generating unit 1b may be one or more, respectively. Furthermore, in the present embodiment, the three first electric field generating units 1a and the three second electric field generating units 1b are arranged alternately.

As shown in FIG. 1B and FIG. 2, in the present embodiment, second traces 1311, 1321 are formed when the third main electrode 131, the fourth main electrode 132, the third sub-electrode 133, and the fourth sub-electrode 134 are formed by patterning the electrode layer. The second trace 1311 electrically connects to the third main electrodes 131 of the three second electric field generating units 1b, and the second trace 1321 electrically connects to the fourth main electrodes 132 of the three second electric field generating units 1b.

As shown in FIG. 2 and FIG. 3B, insulators 151, 152 are formed on the third main electrode 131 and the fourth main electrode 132 respectively, followed by thrilling first traces 161, 162. The first trace 161 electrically connects to the first main electrodes 111 of the three first electric field generating units 1a, and the first trace 162 electrically connects to the second main electrodes 112 of the three first electric field generating units 1a. In the present embodiment, silver lines are sprayed through aerosol jet printing to form the first traces 161, 162. However, the present disclosure is not limited thereto. The first traces 161, 162 may be prepared using other conductive materials such as metal, metal alloy, or other conductive materials having good conductivity or low resistance.

As shown in FIG. 2, in the electric field generating substrate of the present embodiment, the first min electrodes 111 of the first electric field generating units 1a are electrically connected to each other, and external voltage can be applied to each of the first main electrodes 111. The second main electrodes 112 of the first electric field generating units 1a are electrically connected to each other, and external voltage can be applied to each of the second main electrode 112. The third main electrodes 131 of the second electric field generating units 1b are electrically connected to each other, and external voltage can be applied to each of the third main electrodes 131. Likewise, the fourth main electrodes 132 of the second electric field generating units 1b are electrically connected to each other, and external voltage can be applied to each of the fourth main electrodes 132.

In the first electric field generating unit 1a, the first resistor 121 is disposed between the first main electrode 111 and the first sub-electrode 113, the second resistor 122 is disposed between the second sub-electrode 114 and the second main electrode 112, and the third resistor 123 is disposed between the first sub-electrode 113 and the second sub-electrode 114, as shown in FIG. 1A to FIG. 2. When an external voltage is applied to the first main electrode 111 and the second main electrode 112, the voltage can be gradually decreased from one of the first main electrode 111 and the second main electrode 112 to the other through the arrangement of the first resistor 121, the second resistor 122, and the third resistor 123, thereby generating a sawtooth voltage distribution. Likewise, in the second electric field generating unit 1b, the fourth resistor 141 is disposed between the third main electrode 131 and the third sub-electrode 133, the fifth resistor 142 is disposed between the third sub-electrode 133 and the fourth main electrode 132, and the sixth resistor 143 is disposed between the third sub-electrode 133 and the fourth sub-electrode 134. When an external voltage is applied to the third main electrode 131 and the fourth main electrode 132, the voltage can be gradually decreased from one of the third main electrode 131 and the fourth min electrode 132 to the other through the arrangement of the fourth resistor 141, the fifth resistor 142, and the sixth resistor 143, thereby generating a sawtooth voltage distribution.

As shown in the above, in the present embodiment, the main electrodes and the sub-electrodes with desired patterns are obtained by lithographically etching the ITO glass substrate. Then, the resistors and the traces are sprayed to the ITO glass substrate using aerosol jet printing. Thus, the electric field generating substrate of the present embodiment can be obtained by simple process steps. In addition, only the signal generator, which can respectively apply voltage to the main electrodes of the electric field generating units, is required to obtain a sawtooth voltage distribution when the resistors are disposed between the main electrodes and sub-electrodes and between the two sub-electrodes. Therefore, the driving circuit is significantly simplified.

As shown in FIG. 1A, a width W of the first electric field generating unit 1a may be in a range from 4 μm to 80 μm. In details, a distance from an edge 111a of the first main electrode 111 to an edge 112a of the second main electrode 112 is defined as the width W in the first electric field generating unit 1a; wherein said edge 111a of the first main electrode 111 is away from the second main electrode 112, and said edge 112a of the second main electrode 112 is away from the first main electrode 111. In the present embodiment, the width W is 42 μm. However, the present disclosure is not limited thereto. The smaller the width W, the larger the deflection angle of the liquid crystal molecules in the obtained liquid crystal lens is. Therefore, a larger illumination range can be achieved. Since the width design of the second electric field generating unit 1b shown in FIG. 1B is the same as that of the first electric field generating unit 1a shown in FIG. 1A, the details is omitted herein.

Furthermore, a width d of the first main electrode 111 may be in a range from 0.5 μm to 10 μm. In the present embodiment, the width d of the first main electrode 111 may be in a range from 3 μm to 4 μm. However, the present disclosure is not limited thereto. The width design of the second main electrode 112, the first sub-electrode 113, and the second sub-electrode 114 and the width design of the third main electrode 131, the fourth main electrode 132, the third sub-electrode 133, and the fourth sub-electrode 134 shown in FIG. 1B are the same as that of the first main electrode 111 shown in FIG. 1A, so the details are omitted herein.

Embodiment 2

Figure 4:
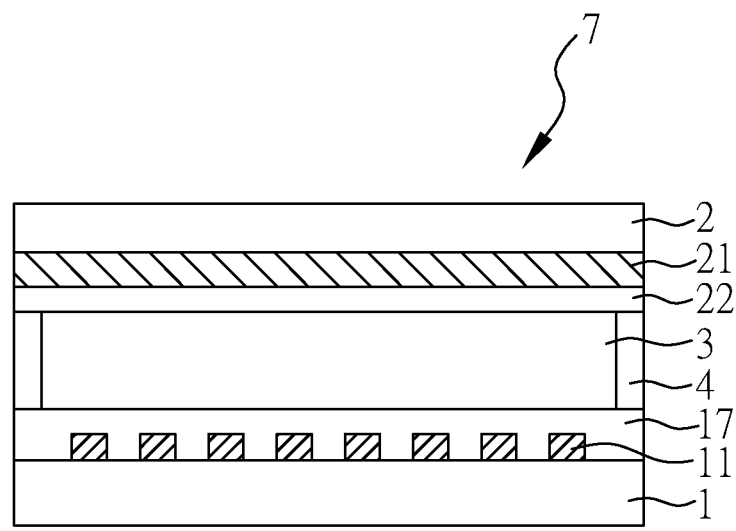
FIG. 4 is a cross-sectional view of a liquid crystal lens according to Embodiment 2 of the present disclosure.

FIG. 4 is a cross-sectional view of a liquid crystal lens of the present embodiment. The liquid crystal lens of the present embodiment comprises: a first electric field generating substrate; and a second electric field generating substrate disposed opposite to the first electric field generating substrate; and a liquid crystal layer 3 disposed between the first electric field generating substrate and the second electric field generating substrate. In the present embodiment, the first electric field generating substrate may be the electric field generating substrate as shown in Embodiment 1. Here, the electric field generating substrate shown in Embodiment 1 is simplified by the first substrate 1 and the electrode layer 11, wherein the electrode layer 11 may comprise the first main electrode 111, the second main electrode 112, the third main electrode 131, the fourth main electrode 132, the first sub-electrode 113, the second sub-electrode 114, the third sub-electrode 133, and the fourth sub-electrode 134 as described in Embodiment 1 (shown in FIG. 2). In the present embodiment, the second electric field generating substrate comprises: a second substrate 2 and a planar electrode layer 21, wherein the planar electrode layer 21 is disposed on one side, facing the first substrate 1, of the second substrate 2. In the present embodiment, the second substrate 2 may be a glass substrate, and the planar electrode layer 21 may be an unpatterned ITO layer. Furthermore, in the present embodiment, the liquid crystal molecules contained in the liquid crystal layer 3 may be a liquid crystal molecule having Δn of 0.2 or more. In addition, the liquid crystal lens of the present embodiment may further comprise: a sealant 4 disposed between the first electric field generating substrate and the second electric field generating substrate.

The liquid crystal lens according to the present embodiment may further comprise: a first alignment layer 17 disposed on the electrode layer 11; and a second alignment layer 22 disposed on the planar electrode layer 21, and an alignment direction of the first alignment layer 17 is substantially the same as an alignment direction of the second alignment layer 22. Here, the alignment directions of the first alignment layer 17 and the second alignment layer 22 may be formed by photoalignment or rubbing alignment.

In the present embodiment, the alignment direction of the first alignment layer 17 may be substantially the same as or perpendicular to the longitudinal directions of the first main electrode 111, the second main electrode 112, the third main electrode 131, the fourth main electrode 132, the first sub-electrode 113, the second sub-electrode 114, the third sub-electrode 133, and the fourth sub-electrode 134 (as shown in FIG. 2), according to the design needs.

Embodiment 3

Figure 5:
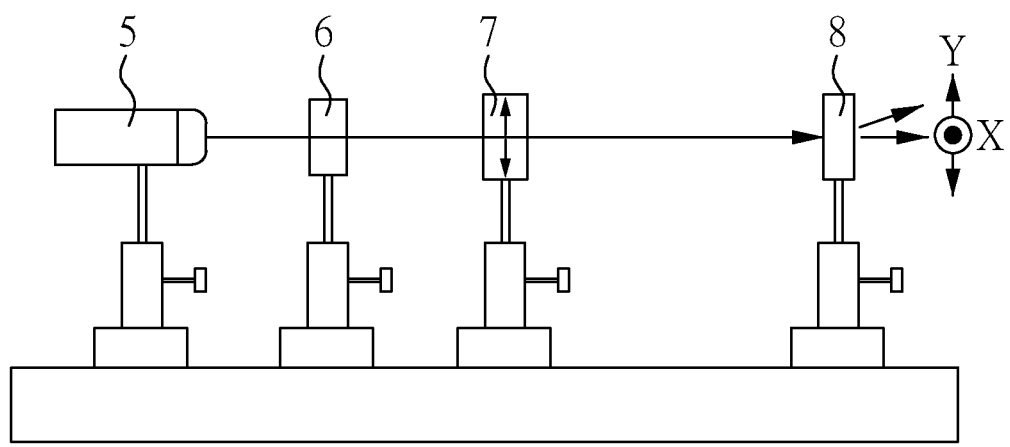
FIG. 5 is a schematic diagram showing a measurement system for polarization state according to Embodiment 3 of the present disclosure.

FIG. 5 is a schematic diagram showing a measurement system for polarization state according to the present embodiment. The measurement system for polarization state comprises: a light source 5, a polarizer 6, a liquid crystal lens 7, and a screen 8. The light source 5 emits a non-polarized light. In the present embodiment, the light source 5 is an LED light source. The liquid crystal lens 7 is a liquid crystal lens as shown in Embodiment 2; and the arrow in the liquid crystal lens 7 refers to the alignment direction of the alignment layer. Further, the polarization direction of the polarizer 6 is the same as the alignment direction of the alignment layer in the liquid crystal lens 7. The polarization direction of the polarizer 6 is parallel to the alignment direction of the liquid crystal lens 7 when the non-polarized light emitted from the light source 5 passes through the polarizer 6; and the light is deflected by the liquid crystal lens 7 and then hit on the screen 8.

Figure 6A:
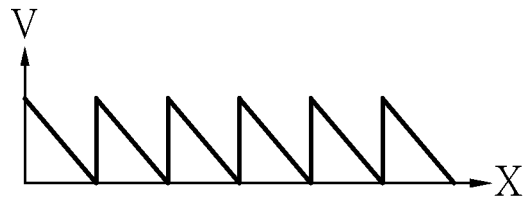
FIG. 6A and FIG. 6B are schematic diagrams showing a voltage and a detected refractive index according to one aspect of Embodiment 3 of the present disclosure.
Figure 6B:
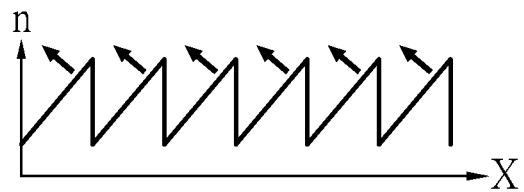

FIG. 6A and FIG. 6B are schematic diagrams showing a voltage and a detected refractive index according to one aspect of the present embodiment. As shown in FIG. 2 and FIG. 6A, the voltage gradually decreases from left to right when a high voltage is applied to the first main electrode 111 and the fourth main electrode 132, and the second main electrode 112 and third main electrode 131 are grounded. The refractive index experienced by the polarized light having the polarized direction the same as the alignment direction of the liquid crystal lens 7 (as shown in FIG. 5), gradually increase from left to right, as shown in FIG. 6B. Therefore, the incident light is deflected to the left.

Figure 6C:
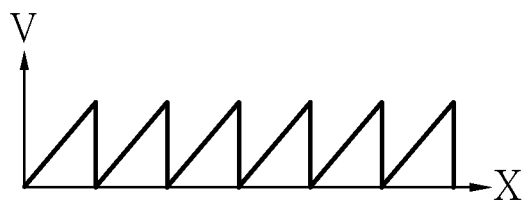
FIGS. 6C and 6D are schematic diagrams showing a voltage and a detected refractive index according to another aspect of Embodiment 3 of the present disclosure.
Figure 6D:
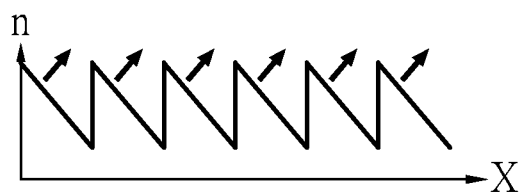

FIGS. 6C and 6D are schematic diagrams showing a voltage and a detected refractive index according to another aspect of this. As shown in FIG. 2 and FIG. 6C, the voltage gradually increases from left to right when a high voltage is applied to the second main electrode 112 and the third main electrode 131, and the first main electrode 111 and fourth main electrode 132 are grounded. The refractive index experienced by the polarized light having the polarized direction the same as the alignment direction of the liquid crystal lens 7 (shown in FIG. 5), gradually decreases from left to right, as shown in FIG. 6D. Therefore, the incident light is deflected to the right.

Figure 6E:
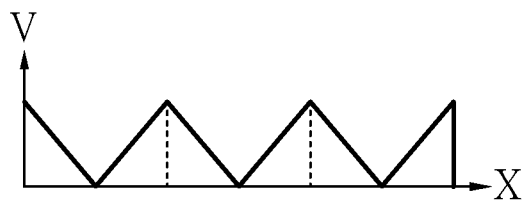
FIGS. 6E and 6F are schematic diagrams showing a voltage and a detected refractive index according to yet another aspect of Embodiment 3 of the present disclosure.
Figure 6F:
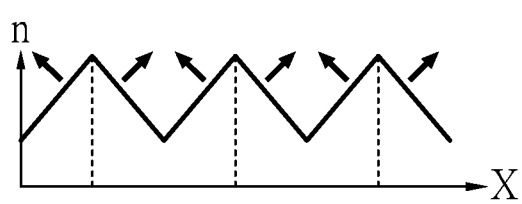

FIGS. 6E and 6F are schematic diagrams showing a voltage and a detected refractive index according to yet another aspect of the present embodiment. Referring to FIG. 2, the voltage distribution is as shown in FIG. 6E when a high voltage is applied to the first main electrode 111 and third main electrode 131, and the second main electrode 112 and fourth main electrode 132 are grounded. The refractive index experienced by the polarized light having the polarized direction the same as the alignment direction of liquid crystal lens 7 (shown in FIG. 5) is as shown in FIG. 6F. Thus, the light is deflected to both right and left sides.

As shown in FIG. 6A to FIG. 6F, in the present embodiment, the incident light can be deflected to the right side, the left side or both sides by controlling the voltage distribution of the first main electrode 111 the second main electrode 112, the third main electrode 131, and the fourth main electrode 132 (as shown in FIG. 2). The deflection of the incident light can be easily controlled by using the electric field generating substrate of the present disclosure, and thus it can reduce the complexity of driving method significantly.

Embodiment 4

Figure 7:
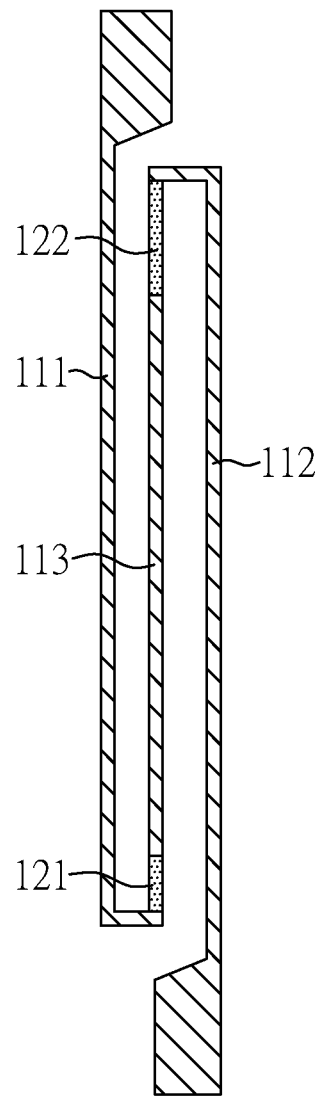
FIG. 7 is a top view of a first electric field generating unit according to Embodiment 4 of the present disclosure.

FIG. 7 is a top view of a first electric field generating unit according to the present embodiment. The first electric field generating unit of the present embodiment is basically the same as the first electric field generating unit of Embodiment 1 shown in FIG. 1A, except that the first electric field generating unit of the present embodiment does not comprise the second sub-electrode 114 and third resistor 123 shown in FIG. 1A.

Embodiment 5

Figure 8:
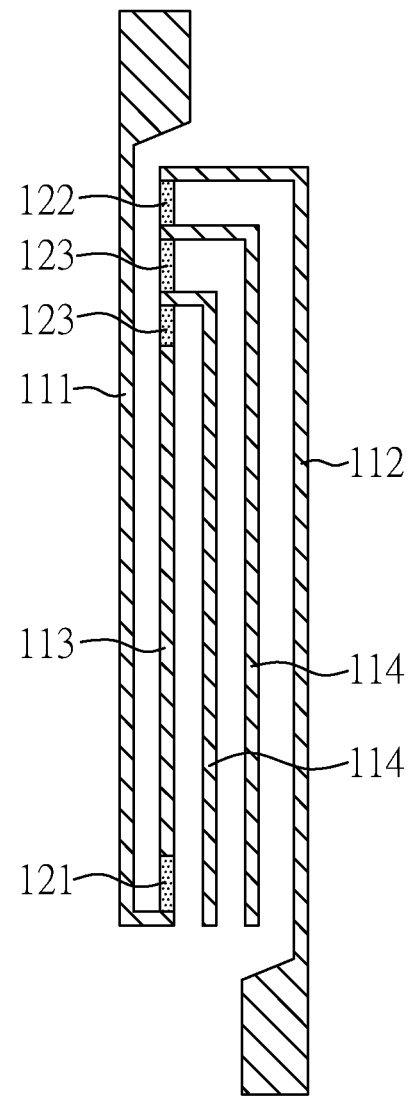
FIG. 8 is a top view of a first electric field generating unit according to Embodiment 5 of the present disclosure.

FIG. 8 is a top view of a first electric field generating unit according to the present embodiment. The first electric field generating unit of the present embodiment is basically the same as the first electric field generating unit of Embodiment 1 shown in FIG. 1A, except that the first electric field generating unit of the present embodiment comprises a plurality of second sub-electrodes 114 and a plurality of third resistors 123.

Embodiment 6

Figure 9:
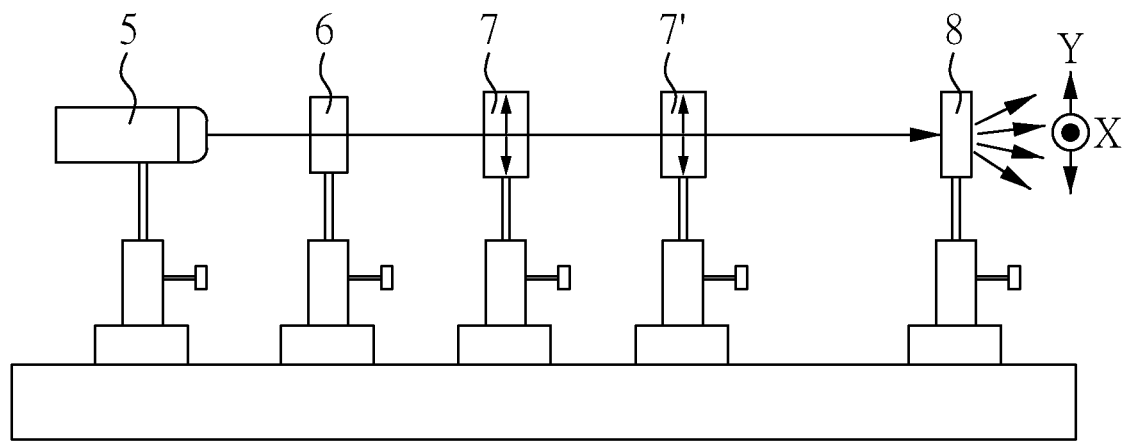
FIG. 9 is a schematic diagram showing a measurement system for polarization state according to Embodiment 6 of the present disclosure.

FIG. 9 is a schematic diagram showing a measurement system for polarization state according to the present embodiment. The measurement system for polarization state of the present embodiment is basically the same as the measurement system for polarization state of Embodiment 3 shown in FIG. 5, except that the measurement system for polarization state of the present embodiment further comprises another liquid crystal lens 7'. In the present embodiment, the liquid crystal lens 7' also uses the liquid crystal lens as described in Embodiment 2.

In the present embodiment, a transmitting light passing through the liquid crystal lens 7 can be modulated by the liquid crystal lens 7' upon satisfaction of two criteria as follows: the longitudinal directions of the main electrode and sub-electrode of the liquid crystal lens 7 is perpendicular to the longitudinal directions of the main electrode and sub-electrode of the liquid crystal lens 7', and the alignment direction of the alignment layer of the liquid crystal lens 7 is parallel to the alignment direction of the alignment layer of the liquid crystal lens 7'. Thus, the incident light can be deflected along four directions in two dimensions through the light modulation by the liquid crystal lens 7 and the liquid crystal lens 7'.

In other embodiments of the present disclosure, more than three liquid crystal lenses can be used, and a purpose of deflecting in multiple directions can be achieved by controlling the relationships between the longitudinal directions of the electrodes in each liquid crystal lens.

Embodiment 7

Figure 10:
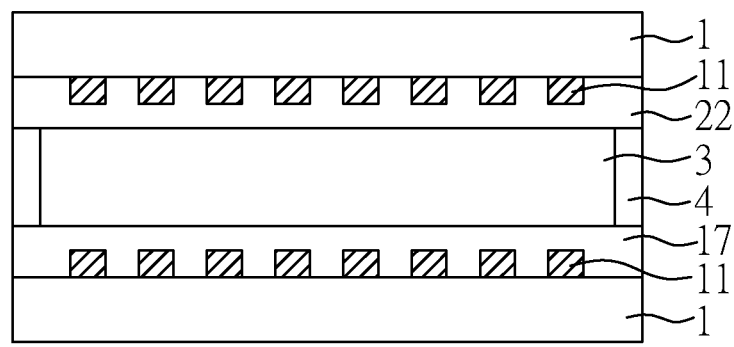
FIG. 10 is a cross-sectional view of a liquid crystal lens according to Embodiment 7 of the present disclosure.

FIG. 10 is a cross-sectional view of a liquid crystal lens according to the present embodiment. A liquid crystal lens of the present embodiment comprises: two first electric field generating substrates, wherein the two first electric field generating substrates are disposed opposite to each other; and a liquid crystal layer 3 disposed between the two first electric field generating substrates. In the present embodiment, each first electric field generating substrate may be the electric field generating substrate of Embodiment 1. Here, the electric field generating substrate shown in Embodiment 1 is simplified through the first substrate 1 and the electrode layer 11 disposed thereon, wherein the electrode layer 11 may comprise the first main electrode 111, the second main electrode 112, the third main electrode 131, the fourth main electrode 132, the first sub-electrode 113, the second sub-electrode 114; the third sub-electrode 133, and the fourth sub-electrode 134 (shown in FIG. 2) as described in Embodiment 1. Furthermore, the liquid crystal molecules in the liquid crystal layer 3 may be a liquid crystal molecule having Δn of 0.2 or more. In addition, the liquid crystal lens of the present embodiment may further comprise: a sealant 4 disposed between the first electric field generating substrate and the second electric field generating substrate.

In the present embodiment; the longitudinal directions of the first main electrode 111, the second main electrode 112, the third main electrode 131, the fourth main electrode 132, the first sub-electrode 113, the second sub-electrode 114, the third sub-electrode 133 and the fourth sub-electrode 134 (shown in FIG. 2) of the tow first electric field generating substrates are substantially the same.

In the present embodiment, the liquid crystal lens may further comprise: a first alignment layer 17 disposed on the electrode layer 11; and a second alignment layer 22 disposed on the other electrode layer 11. Here, alignment directions of the first alignment layer 17 and the second alignment layer 22 may be formed by photoalignment or rubbing alignment. In the present embodiment, the alignment direction of the first alignment layer 17 may be substantially the same as or perpendicular to the alignment direction of the second alignment layer 22, depending on the design or need.

Embodiment 8

Figure 11:
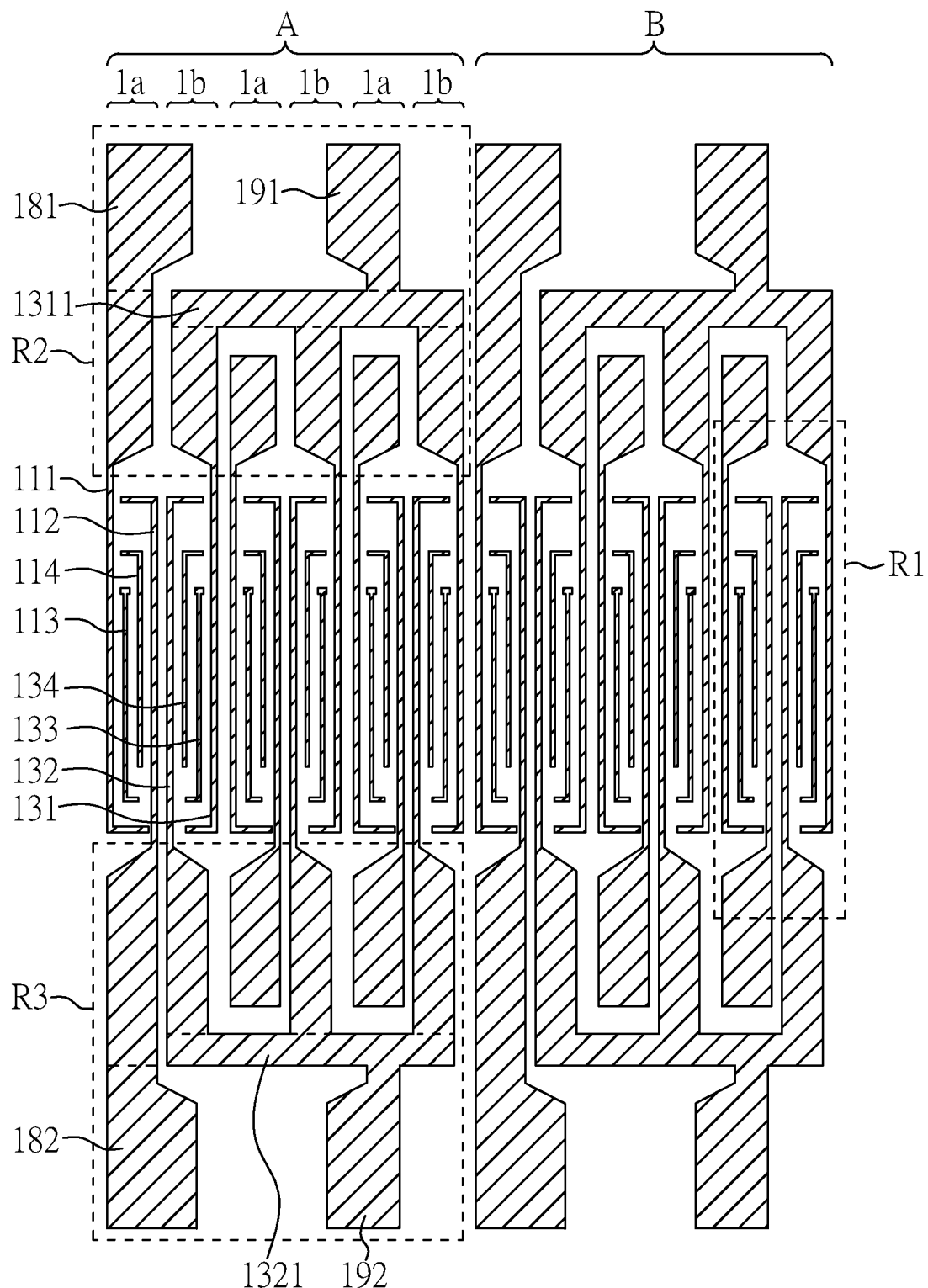
FIG. 11 is a top view showing an electrode configuration of an electric field generating substrate according to Embodiment 8 of the present disclosure.

FIG. 11 is a top view showing an electrode configuration of an electric field generating substrate according to the present embodiment. The electrode configuration of the electric field generating substrate is basically the same as that of Embodiment. In the present embodiment, the first electric field generating unit 1a comprises a first main electrode 111, a second main electrode 112, a first sub-electrode 113, and a second sub-electrode 114; and the second electric field generating unit 1b comprises a third main electrode 131, a fourth main electrode 132, a third sub-electrode 133, and a fourth sub-electrode 134.

Figures 12A, 12B:
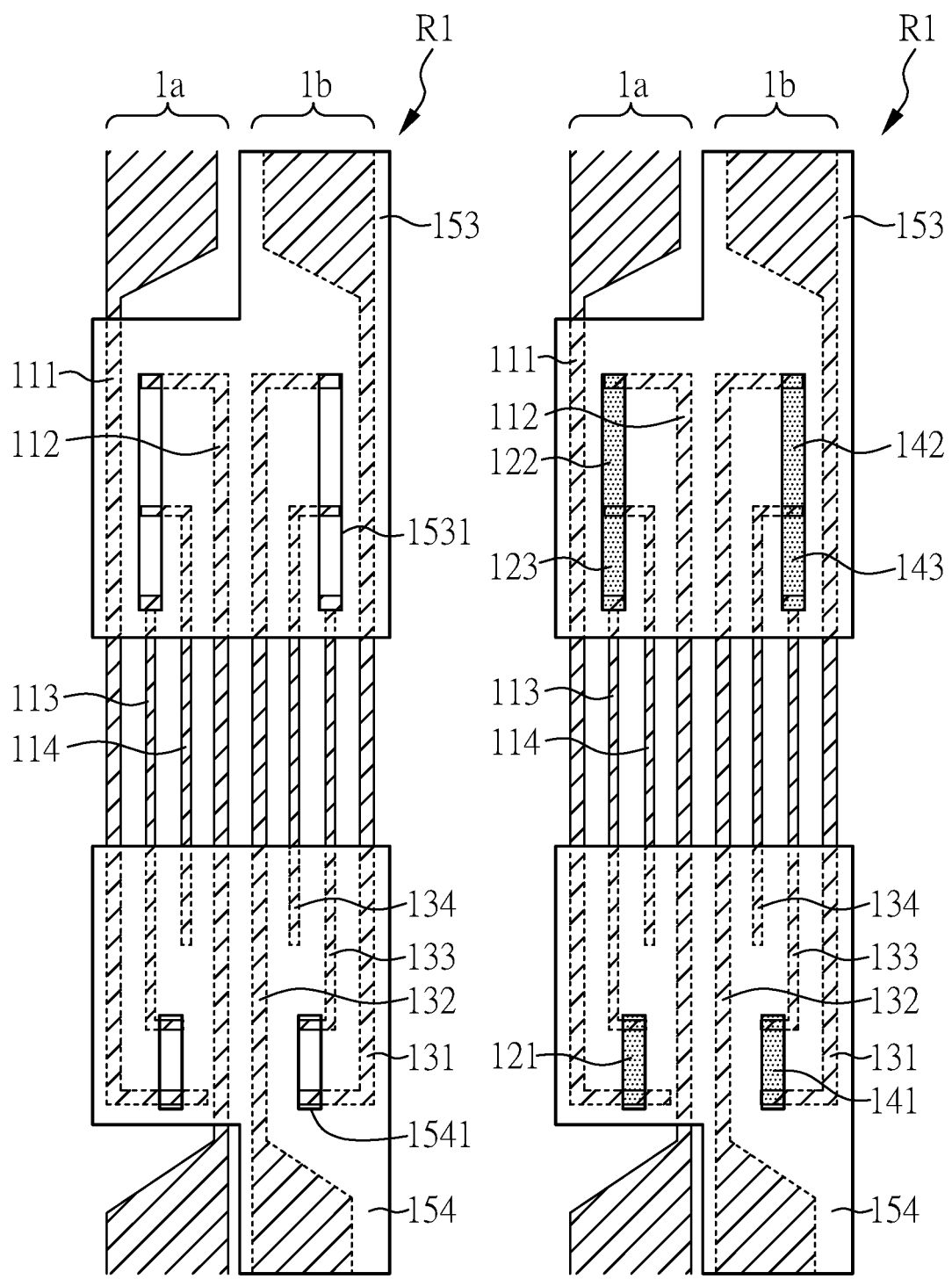
FIG. 12A and FIG. 12B are partially enlarged views of a first electric field generating unit and a second electric field generating unit according to Embodiment 8 of the present disclosure.

FIG. 12A and FIG. 12B are partially enlarged views of a first electric field generating unit and a second electric field generating unit according to the present embodiment, that is, FIG. 12A and FIG. 12B are partially enlarged views of the region R1 in FIG. 11. In the present embodiment, insulating layers 153, 154 shown in FIG. 12A may be formed after the first main electrode 111, the second main electrode 112, the first sub-electrode 113, the second sub-electrode 114, the third main electrode 131, the fourth main electrode 132, the third sub-electrode 133, and the fourth sub-electrode 134 are formed as shown in FIG. 11. The insulating layers 153, 154 comprise insulating layer openings 1531, 1541 corresponding to the regions that are predetermined to subsequently form a first resistor 121, a second resistor 122, a third resistor 123, a fourth resistor 141, a fifth resistor 142, and a sixth resistor 143, as shown in FIG. 12B.

Although it is not shown in the figure, the insulating layer may be optionally disposed between two adjacent first main electrode 111, second main electrode 112, first sub-electrode 113, second sub-electrode 114, third main electrode 131, fourth main electrode 132, third sub-electrode 133, and fourth sub-electrode 134, in other embodiments.

As shown in FIG. 12B, a resistive material is then sprayed by aerosol jet printing, to form a first resistor 121 between the first main electrode 111 and the first sub-electrode 113, form a second resistor 122 between the first sub-electrode 113 and the second main electrode 112, form a third resistor 123 between the first sub-electrode 113 and the second sub-electrode 114, form a fourth resistor 141 between the third min electrode 131 and the third sub-electrode 133, form a fifth resistor 142 between the third sub-electrode 133 and the fourth main electrode 132, and form a sixth resistor 143 between the third sub-electrode 133 and the fourth sub-electrode 134. Thereby, a first electric field generating unit 1a and the second electric field generating unit 1b of the present embodiment are obtained.

In the present embodiment, the structures, materials and preparations of the main electrodes and the sub-electrodes (including the first main electrode 111, the second main electrode 112, the first sub-electrode 113, the second sub-electrode 114, the third main electrode 131, the fourth main electrode 132, the third sub-electrode 133, and the fourth sub-electrode 134) and the resistors (including the first resistor 121, the second resistor 122, the third resistor 123, the fourth resistor 141, the fifth resistor 142, and the sixth resistor 143) are basically the same as those of Embodiment 1, so that the details are omitted here.

Figure 13A:
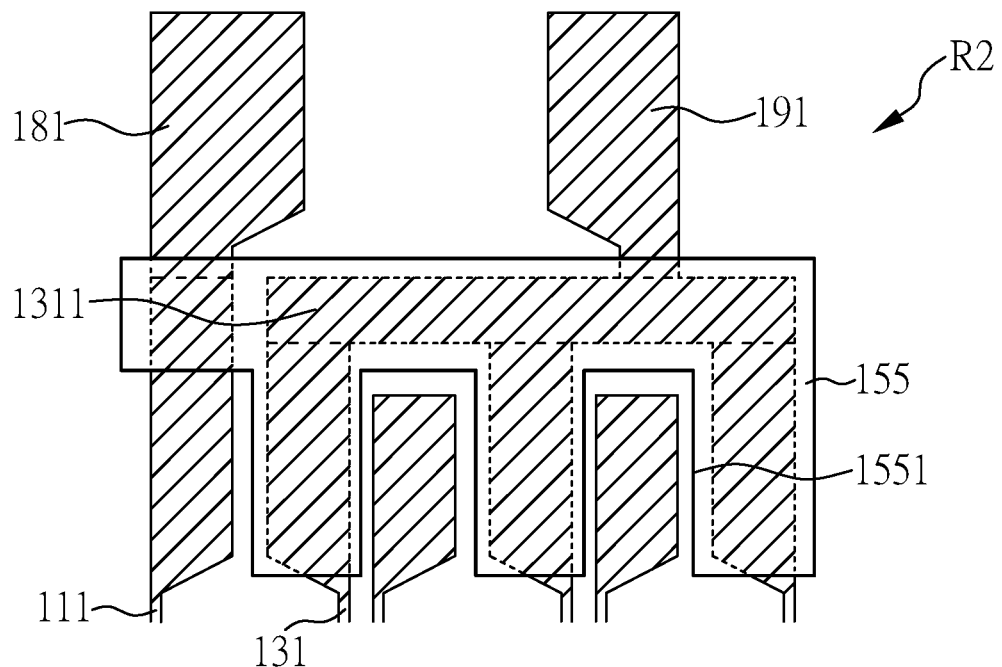
FIG. 13A to FIG. 14B are partial enlarged views of an electric field generating substrate according to the Embodiment 8 of the present disclosure.
Figure 13B:
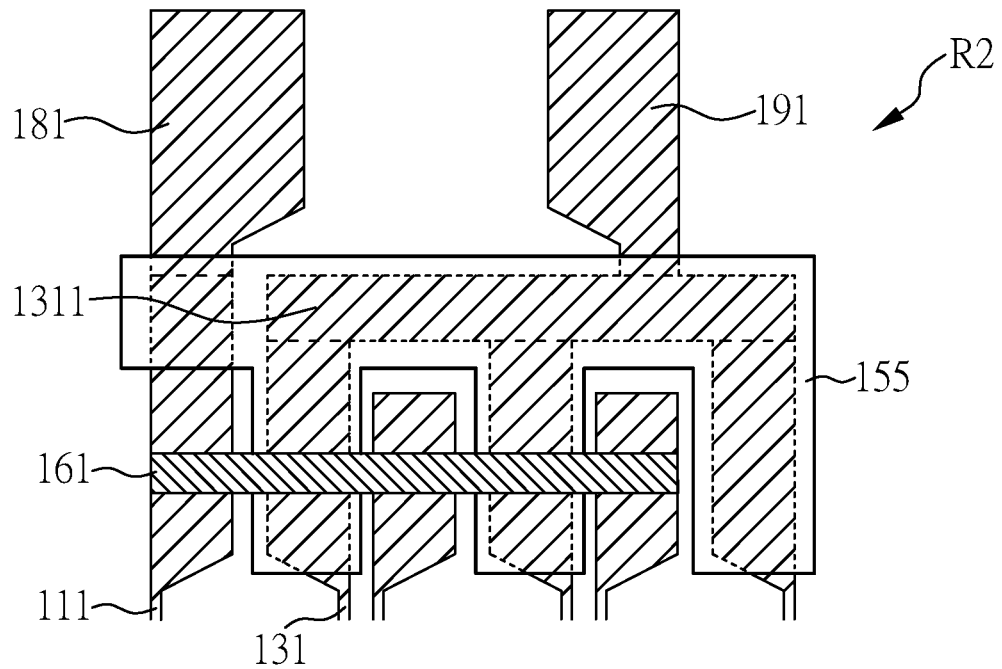

FIG. 13A and FIG. 13B are partial enlarged views of the electric field generating substrate according to the present embodiment, that is, FIG. 13A and FIG. 13B are partial enlarged views of region R2 in FIG. 11. Furthermore, FIG. 14A and FIG. 14B are partial enlarged views of the electric field generating substrate according to the present embodiment, that is, FIG. 14A and FIG. 14B are partial enlarged views of region R3 in FIG. 11.

Figure 14A:
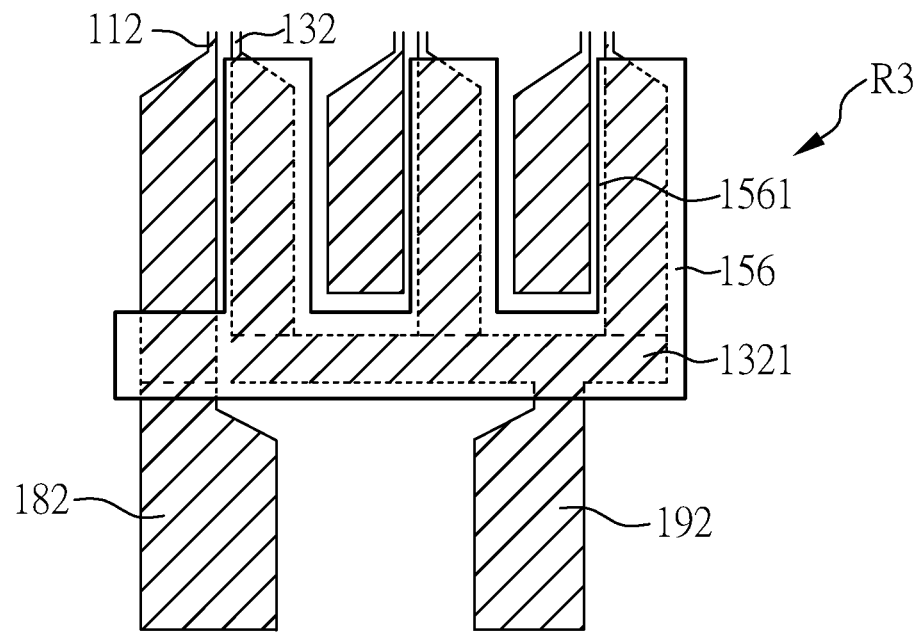
Figure 14B:
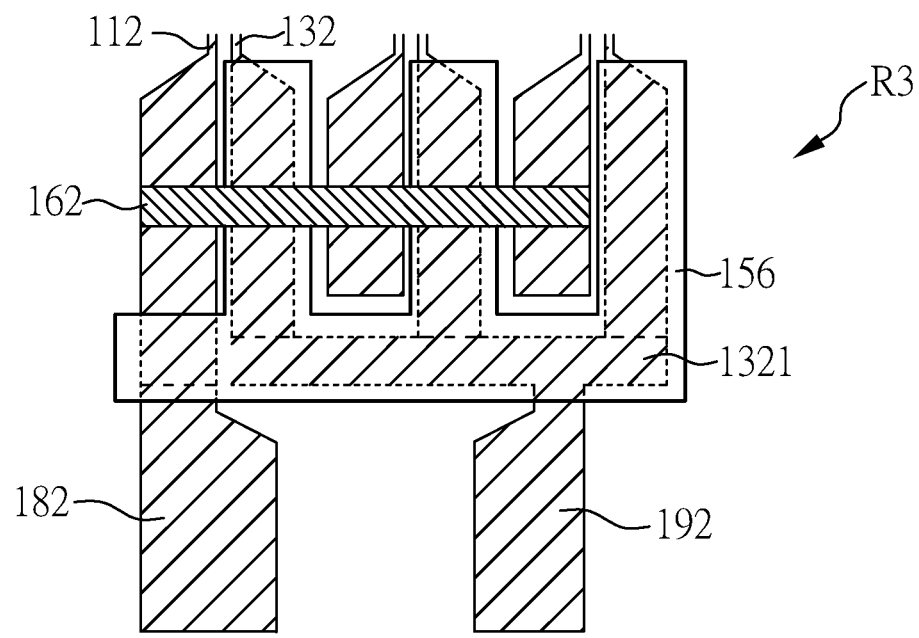

As shown in FIG. 13A and FIG. 14A, insulating layers 155, 156 may be formed after the electrode pattern of the electric field generating substrate is formed. The insulating layers 155, 156 comprise insulating layer openings 1551, 1561, and the insulating layer openings 1551, 1561 correspond to the first main electrode 111 and the second main electrode 112. Then, first traces 161, 162 are formed, as shown in FIG. 13B and FIG. 14B. The first trace 161 electrically connects to three first min electrodes 111, and the first trace 162 electrically connects to three second main electrode 112, thereby electrically connecting three first electric field generating units 1*a* (shown in FIG. 11). In the present embodiment, the structures, materials and preparations of the first traces 161, 165 may be the same as those of Embodiment 1, and thus the details are omitted here.

In addition, in the present embodiment, the material of the insulating layers 153, 154, 155, 156 may be silicon oxide, silicon nitride, silicon oxynitride, aluminum oxide, resin, polymer, photoresist or a combination thereof.

As shown in FIG. 11, the electric filed generating substrate of the present embodiment comprise the first electric field generating unit 1*a* and the second electric field generating unit 1*b*, which are alternately arranged. Here, adjacent first electric field generating unit 1*a* and second electric field generating unit 1*b* may be regarded as a pair of electric field generating units, and the three pairs of electric field generating units may be regarded as an electric field generating unit group. In the present embodiment, the electric field generating substrate comprises an electric field generating unit group A and an electric field generating unit group B. However, the number of the electric field generating units, the number of the electric field generating units included in the electric field generating unit group, and the number of the electric field generating unit groups are not limited thereto. Furthermore, the numbers above can be adjusted if necessary.

As shown FIG. 11 and FIG. 13B, the electric field generating unit group A comprises a first electrical connection pad 181 electrically connecting to one of the first main electrodes 111 of the first electric field generating units 1*a*, and the first main electrodes 111 of the first electric field generating units 1*a* may be electrically connected by the first trace 161. In addition, as shown in FIG. 11 and FIG. 14B, the electric field generating unit group A comprises a second electrical connection pad 182 electrically connecting to one of the second main electrodes 112 of the first electric field generating units 1*a*, and the second main electrodes 112 of the first electric field generating units 1*a* may be electrically connected by the first trace 162. Thereby, the three first electric field generating units 1*a* are electrically connected to each other.

Likewise, as shown in FIG. 11, the electric field generating unit group A further comprises a third electrical connection pad 191 electrically connecting to the second trace 1311; and the second trace 1311 electrically connecting to the third main electrodes 131 of the second electric field generating units 1*b*. In addition, the electric field generating unit group A comprises a fourth electrical connection pad 192 electrically connecting to the second trace 1321; and the second trace 1321 electrically connects to the fourth main electrodes 132 of the second electric field generating units 1*b*. Thereby, the three second electric field generating units 1*b* are connected to each other.

The electric field generating substrate of the present embodiment can also be applied to the liquid crystal lens of the aforementioned embodiment, the application is the same as described above, and thus the description is omitted here.

In summary, the present disclosure provides a novel electric field generating substrate, which can form main electrodes and sub-electrodes through a simple patterning process, and then form traces and resistors through coating, thereby significantly simplifying the preparation process. In addition, in the liquid crystal lens to which the electric field generating substrate of the present disclosure is applied, the deflection direction of the incident light can be controlled by applying a voltage to the main electrodes. Thereby, the complexity of driving method can be greatly reduced, and thus the liquid crystal lens can be widely applied.

Although the present disclosure has been explained in relation to its embodiment, it is to be understood that many other possible modifications and variations can be made without departing from the spirit and scope of the disclosure as hereinafter claimed.

What is claimed is:

1. An electric field generating substrate, comprising:
   a first substrate; and
   a first electric field generating unit disposed on the first substrate and comprising:
   a first main electrode;
   a second main electrode;
   a first sub-electrode disposed between the first main electrode and the second main electrode, wherein the first sub-electrode electrically connects to the first main electrode and the second main electrode, a first resistor is disposed between the first main electrode and the first sub-electrode, and a second resistor is disposed between the first sub-electrode and the second main electrode; and
   a second sub-electrode disposed between the first sub-electrode and the second main electrode, wherein the second sub-electrode has a first end and a second end, the first end of the second sub-electrode electrically connects to the first sub-electrode and the second main electrode, a third resistor is disposed between the first sub-electrode and the second sub-electrode, the second resistor is disposed between the second sub-electrode and the second main electrode, and the second end of the second sub-electrode does not connect to the first main electrode, the first sub-electrode and the second main electrode;
   wherein, the first main electrode, the second main electrode, the first sub-electrode and the second sub-electrode are substantially parallel to each other.

2. The electric field generating substrate according to claim 1, further comprising a second electric field generating unit disposed on the first substrate and comprising:
   a third main electrode;
   a fourth main electrode; and
   a third sub-electrode disposed between the third main electrode and the fourth main electrode, wherein the third sub-electrode electrically connects to the third main electrode and the fourth main electrode, a fourth resistor is disposed between the third main electrode and the third sub-electrode, and a fifth resistor is disposed between the third sub-electrode and the fourth main electrode,
   wherein, the first main electrode, the second main electrode, the third main electrode, the fourth main electrode, the first sub-electrode, the second sub-electrode and the third sub-electrode are substantially parallel to each other.

3. The electric field generating substrate according to claim 1, further comprising a second electric field generating unit disposed on the first substrate and comprising:
   a third main electrode;
   a fourth main electrode;
   a third sub-electrode disposed between the third main electrode and the fourth main electrode, wherein the third sub-electrode electrically connects to the third main electrode, and a fourth resistor is disposed between the third main electrode and the third sub-electrode; and a fourth sub-electrode disposed between the third sub-electrode and the fourth main electrode, wherein the fourth sub-electrode electrically connects to the third sub-electrode and the fourth main electrode, a fifth resistor is disposed between the third sub-electrode and the fourth main electrode, and a sixth resistor is disposed between the third sub-electrode and the fourth sub-electrode, wherein, the first main electrode, the second main electrode, the third main electrode, the fourth main electrode, the first sub-electrode, the second sub-electrode, the third sub-electrode, and the fourth sub-electrode are substantially parallel to each other.

4. The electric field generating substrate according to claim 2, comprising a plurality of first electric field generating units and a plurality of second electric field generating units, wherein the plurality of first electric field generating units and the plurality of second electric field generating units are alternately arranged.

5. The electric field generating substrate according to claim 4, wherein the first main electrodes of the plurality of first electric field generating units electrically connect to each other, the second main electrodes of the plurality of first electric field generating units electrically connect to each other, the third main electrodes of the plurality of second electric field generating units electrically connect to each other, and the fourth main electrodes of the plurality of second electric field generating units electrically connect to each other.

6. The electric field generating substrate according to claim 3, comprising a plurality of first electric field generating units and a plurality of second electric field generating units, wherein the plurality of first electric field generating units and the plurality of second electric field generating units are alternately arranged.

7. The electric field generating substrate according to claim 6, wherein the first main electrodes of the plurality of first electric field generating units electrically connect to each other, the second main electrodes of the first electric field generating units electrically connect to each other, the third main electrodes of the plurality of second electric field generating units electrically connect to each other, and the fourth main electrodes of the second electric field generating units electrically connect to each other.

8. A liquid crystal lens, comprising:
a first electric field generating substrate, comprising:
a first substrate; and
a first electric field generating unit disposed on the first substrate and comprising:
a first main electrode;
a second main electrode; and
a first sub-electrode disposed between the first main electrode and the second main electrode, wherein the first sub-electrode electrically connects to the first main electrode and the second main electrode, a first resistor is disposed between the first main electrode and the first sub-electrode, and a second resistor is disposed between the first sub-electrode and the second main electrode; and
a second sub-electrode disposed between the first sub-electrode and the second main electrode, wherein the second sub-electrode has a first end and a second end, the first end of the second sub-electrode electrically connects to the first sub-electrode and the second main electrode, a third resistor is disposed between the first sub-electrode and the second sub-electrode, the second resistor is disposed between the second sub-electrode and the second main electrode, and the second end of the second sub-electrode does not connect to the first main electrode, the first sub-electrode and the second main electrode;
wherein, the first main electrode, the second main electrode, the first sub-electrode and the second sub-electrode are substantially parallel to each other;
a second electric field generating substrate disposed opposite to the first electric field generating substrate; and
a liquid crystal layer disposed between the first electric field generating substrate and the second electric field generating substrate.

9. The liquid crystal lens according to claim 8, wherein the second electric field generating substrate comprises: a second substrate and a planar electrode layer, wherein the planar electrode layer is disposed on a side, facing the first substrate, of the second substrate.

10. The liquid crystal lens according to claim 9, further comprising:
a first alignment layer disposed on the first main electrode, the second main electrode, the first sub-electrode and the second sub-electrode; and
a second alignment layer disposed on the planar electrode layer, wherein an alignment direction of the first alignment layer is substantially the same as an alignment direction of the second alignment layer.

11. The liquid crystal lens according to claim 8, wherein the first electric field generating substrate further comprises a second electric field generating unit disposed on the first substrate and comprising:
a third main electrode;
a fourth main electrode; and
a third sub-electrode disposed between the third main electrode and the fourth main electrode, wherein the third sub-electrode electrically connects to the third main electrode and the fourth main electrode, a fourth resistor is disposed between the third main electrode and the third sub-electrode, and a fifth resistor is disposed between the third sub-electrode and the fourth main electrode,
wherein, the first main electrode, the second main electrode, the third main electrode, the fourth main electrode, the first sub-electrode, the second sub-electrode and the third sub-electrode are substantially parallel to each other.

12. A liquid crystal lens, comprising:
two first electric field generating substrates, wherein the two first electric field generating substrates are disposed opposite to each other, and the two first electric field generating substrates respectively comprise:
a first substrate; and
a first electric field generating unit disposed on the first substrate and comprising:
a first main electrode;
a second main electrode; and
a first sub-electrode disposed between the first main electrode and the second main electrode, wherein the first sub-electrode electrically connects to the first main electrode and the second main electrode, a first resistor is disposed between the first main electrode and the first sub-electrode, and a second resistor is disposed between the first sub-electrode and the second main electrode; and
a second sub-electrode disposed between the first sub-electrode and the second main electrode, wherein the second sub-electrode has a first end and a second end, the first end of the second sub-electrode electrically connects to the first sub-electrode and the second main electrode, a third resistor is disposed between the first sub-electrode and the second sub-electrode, the second resistor is disposed between the second sub-electrode and the second main electrode, and the second end of the second sub-electrode does not connect to the first main electrode, the first sub-electrode and the second main electrode;

wherein, the first main electrode, the second main electrode, the first sub-electrode and the second sub-electrode are substantially parallel to each other; and a liquid crystal layer disposed between the two first electric field generating substrates.

13. The liquid crystal lens according to claim 12, wherein longitudinal directions of the first main electrode, the second main electrode, the first sub-electrode and the second sub-electrode of one of the two first electric field generating substrates are substantially the same as longitudinal directions of the first main electrode, the second main electrode, the first sub-electrode and the second sub-electrode of the other of the two first electric field generating substrates.

14. The liquid crystal lens according to claim 12, further comprising:
   a first alignment layer disposed on the first main electrode, the second main electrode, the first sub-electrode and the second sub-electrode of one of the two first electric field generating substrates; and
   a second alignment layer disposed on the first main electrode, the second main electrode, the first sub-electrode and the second sub-electrode of the other of the two first electric field generating substrates.

15. The liquid crystal lens according to claim 14, wherein an alignment direction of the first alignment layer is substantially the same as an alignment direction of the second alignment layer.

16. The liquid crystal lens according to claim 14, wherein an alignment direction of the first alignment layer is substantially perpendicular to an alignment direction of the second alignment layer.

17. The liquid crystal lens according to claim 12, wherein the two first electric field generating substrates respectively comprise a second electric field generating unit disposed on the first substrate and comprising:
   a third main electrode;
   a fourth main electrode; and
   a third sub-electrode disposed between the third main electrode and the fourth main electrode, wherein the third sub-electrode electrically connects to the third main electrode and the fourth main electrode, a fourth resistor is disposed between the third main electrode and the third sub-electrode, and a fifth resistor is disposed between the third sub-electrode and the fourth main electrode,
   wherein, the first main electrode, the second main electrode, the third main electrode, the fourth main electrode, the first sub-electrode, and the third sub-electrode are substantially parallel to each other.

* * * * *